US008427668B2

(12) United States Patent  (10) Patent No.: US 8,427,668 B2
Markel et al.  (45) Date of Patent: Apr. 23, 2013

(54) GRID JOB SUBMISSION USING SHARED NETWORK FILESYSTEM

(75) Inventors: Arieh Markel, Broomfield, CO (US); Peter Alexander Wilson, Mountain View, CA (US); Mark A. Son-Bell, Los Altos, CA (US); Carl F. Meske, Jr., San Jose, CA (US); Gregory A. Williams, Colorado Springs, CO (US); Peter H. Schow, Longmont, CO (US)

(73) Assignee: Oracle America Inc., Redwood Shores, CA (US)

( * ) Notice: Subject to any disclaimer, the term of this patent is extended or adjusted under 35 U.S.C. 154(b) by 1109 days.

(21) Appl. No.: 11/480,682

(22) Filed: Jul. 3, 2006

(65) Prior Publication Data
US 2008/0007763 A1 Jan. 10, 2008

(51) Int. Cl.
*G06F 3/12* (2006.01)

(52) U.S. Cl.
USPC ......... 358/1.15; 358/1.1; 358/1.13; 358/1.18; 714/15

(58) Field of Classification Search .................. 358/1.1, 358/1.15
See application file for complete search history.

(56) References Cited

U.S. PATENT DOCUMENTS

| 4,799,156 | A | 1/1989 | Shavit et al. |
| 5,535,407 | A | 7/1996 | Yanagawa et al. |
| 5,892,900 | A | 4/1999 | Ginter et al. |
| 6,085,234 | A * | 7/2000 | Pitts et al. ................ 709/217 |
| 6,317,815 | B1 * | 11/2001 | Mayer et al. .............. 711/165 |
| 6,493,871 | B1 | 12/2002 | McGuire et al. |
| 6,496,858 | B1 * | 12/2002 | Frailong et al. ........... 709/221 |
| 6,496,974 | B1 | 12/2002 | Sliger et al. |
| 6,658,660 | B1 | 12/2003 | Minyard |
| 6,687,745 | B1 | 2/2004 | Franco et al. |
| 6,751,794 | B1 * | 6/2004 | McCaleb et al. ............. 717/168 |
| 6,999,912 | B2 | 2/2006 | Loisey et al. |
| 7,389,219 | B2 | 6/2008 | Loisey et al. |
| 2003/0182411 | A1 | 9/2003 | Wang et al. |
| 2003/0195960 | A1 * | 10/2003 | Merriam ........................ 709/224 |
| 2003/0225866 | A1 | 12/2003 | Hudson |
| 2004/0174557 | A1 * | 9/2004 | Sasama ........................ 358/1.15 |
| 2006/0047716 | A1 * | 3/2006 | Keith, Jr. ........................ 707/203 |

FOREIGN PATENT DOCUMENTS

JP  2003196520 A  7/2003

OTHER PUBLICATIONS

Cardellini and Casalicchio, "The State of the Art in Locally Distributed Web-server Systems", ACM Computing Survey, vol. 34, No. 2, Jun. 2002 (49 Pages).
Patent Abstracts of Japan, Publication No. 2003-196520, Publication Date Jul. 11, 2003, (1 Page).
Office Action in U.S. Appl. No. 11/327,063, Mailed Apr. 2, 2009, (15 Pages).
Office Action in U.S. Appl. No. 11/327,719, Mailed May 4, 2009, (15 Pages).
Office Action in U.S. Appl. No. 11/327,719, Mailed Sep. 8, 2009, (21 Pages).
Office Action in U.S. Appl. No. 11/326,735, Mailed Jul. 24, 2009, (14 Pages).

* cited by examiner

*Primary Examiner* — Benny Q Tieu
*Assistant Examiner* — Martin Mushambo
(74) *Attorney, Agent, or Firm* — Osha Liang LLP

(57) ABSTRACT

A method for executing a job using a remote file system that includes obtaining a plurality of job data files by the remote file system, wherein the plurality of job data files are created on the remote file system, detecting a job request for the job in an input directory to obtain a detected job request, wherein the job request is generated by a client, and executing the job based on the job data files and the detected job request, wherein executing the job generates an output file, wherein the remote file system is accessible using a local file system of the client.

8 Claims, 7 Drawing Sheets

GRID JOB SUBMISSION USING SHARED NETWORK FILESYSTEM

CROSS-REFERENCE TO RELATED APPLICATIONS

The present application contains subject matter that may be related to the subject matter in the following U.S. patent applications assigned to a common Assignee: U.S. patent application Ser. No. 11/326,735, entitled, "Targeted Automatic Patch Retrieval" and filed on Jan. 6, 2006; U.S. patent application Ser. No. 11/327,063, entitled, "System for Providing Managed Computing Service" and filed on Jan. 6, 2006; U.S. patent application Ser. No. 11/326,864, entitled, "Click and Run Software Purchasing" and filed on Jan. 6, 2006; and U.S. patent application Ser. No. 11/327,719, entitled, "File System Interface To Web and Network Services" and filed on Jan. 6, 2006.

BACKGROUND

The typical distributed computer system includes multiple interconnected nodes, connection devices, and a connection medium. One common example of a distributed computer system is the Internet. Through the Internet, nodes in one region of the world are able to communicate with nodes in a different region.

The interconnection of nodes in a distributed computer system provides a mechanism for a client to use the processing power and environment that is not available locally. Specifically, a client can submit a job to a collection of processors that are remotely located. Submitting a job is typically achieved using a web form or accessing a file transfer protocol (FTP) server. In the web form scenario, the client uploads the executable and any required data files and clicks a submit button. When using an FTP server, the client transfers the files to the remote computer. Next the client requests that the file is executed. At the end of the execution of the job, the results are transmitted back to the client. If the client wants to view the results mid-execution, then the client stops execution of the program and requests the results. The results are then sent to the client.

For example, consider the example of forecasting weather patterns. In order to forecast weather patterns, meteorological researchers may create weather modeling programs on a local computer. Typically, the researcher also collects data from satellites, electronic data collection stations, planes, etc. Using the collected data, the researcher will populate a series of data files on a local computer. Once the data files are populated, the researcher my access the Internet through a web browser, or access an ftp server. Using the web browser or ftp server, the researcher sends the weather modeling program and the series of data files to a collection of processors. The researcher than requests that the weather modeling program is executed by clicking the submit button or typing the correct command. After the execution of the program, the researcher may obtain the results by copying a file that contains the results to the local computer and opening the file.

SUMMARY

In general, in one aspect, the invention relates to a method for executing a job using a remote file system that includes obtaining a plurality of job data files by the remote file system, wherein the plurality of job data files are created on the remote file system, detecting a job request for the job in an input directory to obtain a detected job request, wherein the job request is generated by a client, and executing the job based on the job data files and the detected job request, wherein executing the job generates an output file, wherein the remote file system is accessible using a local file system of the client.

In general, in one aspect, the invention relates to a system for executing a job that includes a remote file system at a backend data center for obtaining a plurality of job data files, wherein the plurality of job data files are created on the remote file system, and detecting a job request for the job in an input directory to obtain a detected job request, wherein the job request is generated by a client, wherein the remote file system is accessible using a local file system of the client, and a processor at the backend data center configured to execute the job based on the job data files and the detected job request, wherein executing the job generates an output file.

In general, in one aspect, the invention relates to a distributed computer system having a plurality of nodes for performing a method that includes obtaining a plurality of job data files by a remote file system, wherein the plurality of job data files are created on the remote file system, detecting a job request for a job in an input directory to obtain a detected job request, wherein the job request is generated by a client, and executing the job based on the job data files and the detected job request, wherein executing the job generates an output file, wherein the remote file system is accessible using a local file system of the client, and wherein the obtaining the plurality of job data files and executing the job is performed on at least one of the plurality of nodes.

Other aspects of the invention will be apparent from the following description and the appended claims.

DETAILED DESCRIPTION

Figure 1:
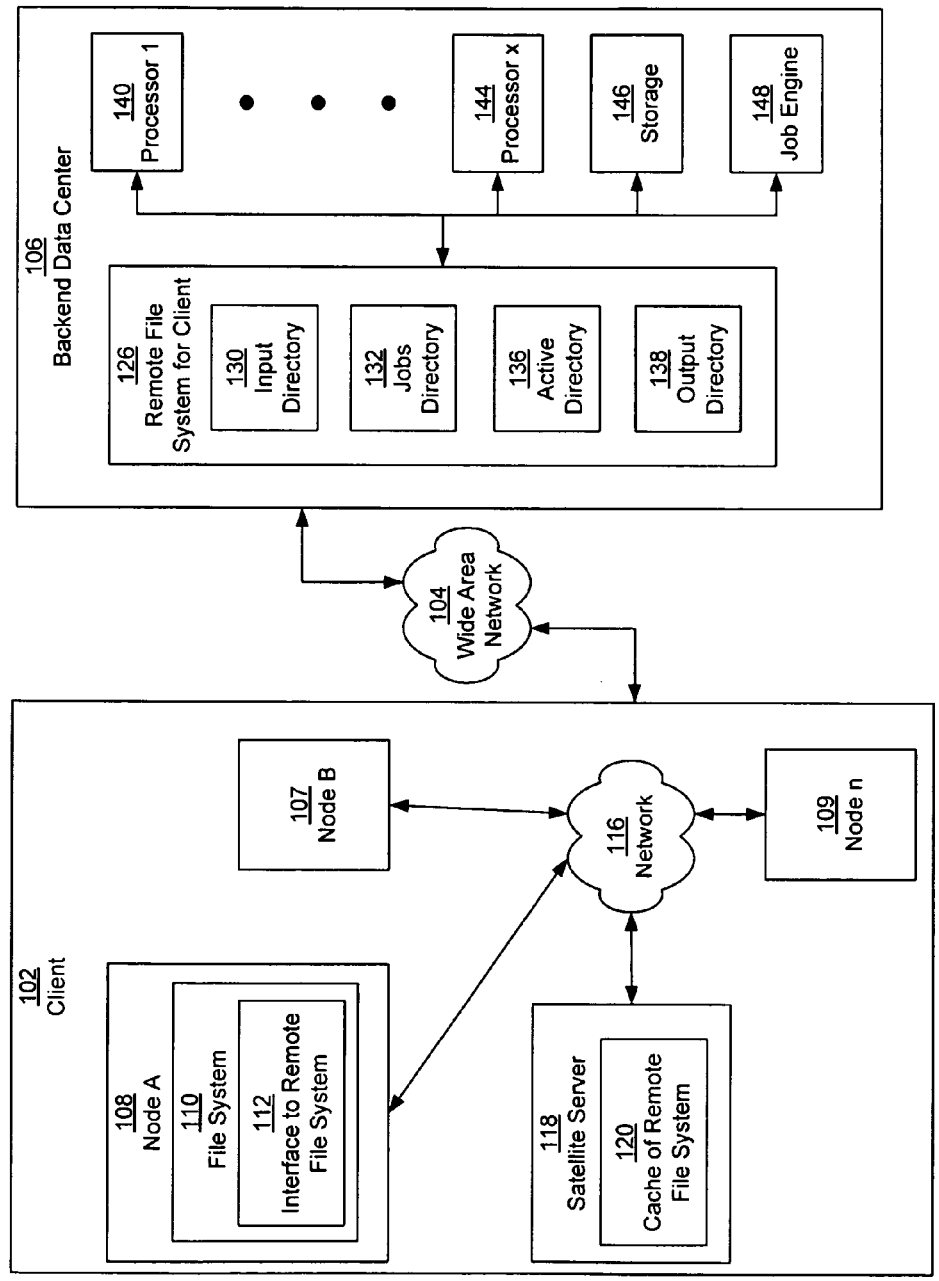
FIG. 1 shows a schematic diagram of a system for job processing in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a mechanism for job submission and execution using a remote file system that is accessible locally. A job corresponds to any type of script, process, program, application in any form (e.g., source code, executable, etc.) that is to be executed. Specifically, in one or more embodiments of the invention, the client may develop any files necessary for executing the job on the remote file system. Then, the client transfers a job request as a file to an input directory. Upon receiving the file in the input directory, the job is detected and executed according to any parameters. In addition, embodiments of the invention provide a mechanism for a client to review any generated result while the job is executing. Thus, the job does not need to be halted in order to view the results.

FIG. 1 shows a schematic diagram of a system for job processing in accordance with one or more embodiments of the invention. The system includes a client (102) connected to a backend data center (106) via the wide area network (104) (e.g., the Internet). Each of these components is described in detail below.

As shown in FIG. 1, the client (102) includes a node (e.g., node A (108), node B (107), node n (109)), a network (116), and satellite server (118). Each of these components is described in detail below.

A node (e.g., node A (108), node B (107), node n (109)) corresponds to any type of computing device, such as a laptop computer, personal digital assistant, server, desktop computer, etc. At least one node (e.g., node A (108), node B (107), node n (109)) on the client (102) includes a file system (110) with an interface to a remote file system (112).

The file system (110) may correspond to a file system for the entire client (102) or only for node (108). The file system (110) may correspond to any type of file system known in the art. In one or more embodiments of the present invention, the file system (110) includes an interface to a remote file system (112).

The interface to the remote file system (112) provides access to the remote file system for the client (126) (described below). Specifically, in one or more embodiments of the invention, as part of a directory structure for the file system (110) appears the remote file system. For example, a node may have a file system (110) with a "c:" drive which corresponds to a local hard drive, an "a:" drive which corresponds to a local floppy drive, and an "e:" drive which corresponds to the interface to remote file system (112). Accordingly, in one or more embodiments of the invention, an administrator or application may access files on the remote file system for the client (126) using a similar interface (i.e., user interface (UI) or application programming interface (API)) provided for accessing files on a local disk. Thus, in accordance with one or more embodiments of the invention, the remote file system for the client (126) is simultaneously visible to both the client (102) and the backend data center (106).

Those skilled in the art will appreciate that the computer system node (e.g., node A (108), node B (107), node n (109)) may also include other components, such as various applications (not shown), which include functionality to access the remote file system through the interface for the remote file system (112). Specifically, in one or more embodiments of the invention, the applications may be easily adjusted to save and retrieve files from the remote file system using the interface to the remote file system (112). By performing the simple modifications to the applications, the applications may communicate with a backend data center (106) (described below) to obtain functionality from the backend data center (106) (described below).

Further, those skilled in the art will appreciate that a node (e.g., node A (108), node B (107), node n (109)) may not be located within the parameters of client (102). Specifically, a node (e.g., node A (108), node B (107), node n (109)) may correspond to a laptop computer of a user in transit. Accordingly, a node (e.g., node A (108), node B (107), node n (109)) may be directly connected to the wide area network (104).

However, when the node (e.g., node A (108), node B (107), node n (109)) is within parameters of the client (102), a network (116) may be used to connect the nodes (e.g., node A (108), node B (107), node n (109)). The network (116) may correspond to any type of mechanism for connecting nodes (e.g., node A (108), node B (107), node n (109)). Specifically, the network (116) may correspond to direct connections between the nodes (e.g., node A (108), node B (107), node n (109)), one or more local area network (LANs), wide area networks (WANs), and other such connections.

Connected to the nodes (e.g., node A (108), node B (107), node n (109))) via a network (116) is a satellite server (118) in accordance with one or more embodiments of the invention. The satellite server (118) is a server that includes functionality to maintain a cache of the remote file system (120) for the client (102). The cache of the remote file system (120) maintains recently accessed information. Accordingly, the satellite server (118) may include a synchronization protocol for synchronizing files between the cache for the remote file system (120) and the remote file system for the client (126). Having a cache for the remote file system (120) reduces bandwidth requirements and increases the availability for the remote file system for the client (126) on the client (102). Alternatively, those skilled in the art will appreciate that the cache for the remote file system (120) may not exist or may be stored in the node (e.g., node A (108), node B (107), node n (109)).

Those skilled in the art will appreciate that while FIG. 1 shows the client (102) as including multiple nodes (e.g., node A (108), node B (107), node n (109)), such as nodes found in a large entity (e.g., company, educational institution, or other organization), the client (102) may also correspond to a single node for an individual user.

Continuing with FIG. 1, a backend data center (106) is connected to the client (102) in accordance with one or more embodiments of the invention. The backend data center (106) corresponds to a group of connected servers (not shown).

The backend data center (106) includes functionality to allow for creation of jobs on the remote file system for the client (126), receive job related files, and process jobs. Components of the backend data center (106) may be physically located together (e.g., in the same building) or physically dispersed. As shown in FIG. 1, the backend data center (106) includes a remote file system for a client (126), one or more processors (e.g., processor 1 (140), processor x (144)), storage (146), and a job engine (148). Each of these components is described in more detail below.

In one or more embodiments of the invention, each client (102) has a remote file system (126) for the client (102). The remote file system (126) includes an input directory (130), a jobs directory (132), an active directory (136), and an output directory (138). In general, the aforementioned directories may correspond to any type of storage unit or management structure, such as a database, queue, stack, file folder, etc. Each of the aforementioned directories is described below and in FIG. 2.

Figure 2:
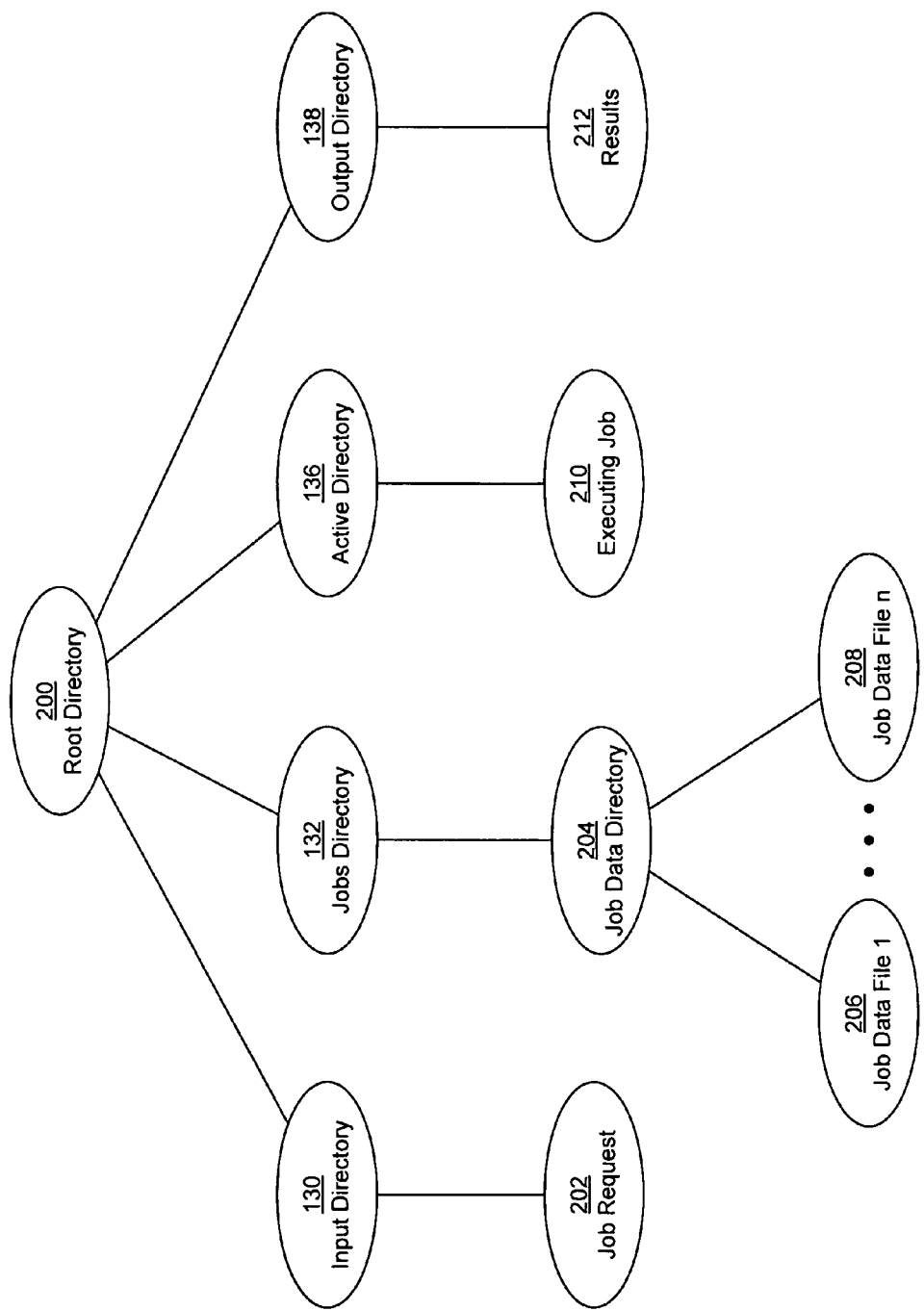
FIG. 2 shows a schematic diagram of a directory structure for job processing in accordance with one or more embodiments of the invention.

FIG. 2 shows a schematic diagram of a directory structure for job processing in accordance with one or more embodiments of the invention. Specifically, FIG. 2 shows an example directory structure for maintaining the directories for the client.

In one or more embodiments of the invention, at the top of the directory structure is the root directory (200). The root directory (200) may correspond to the root for multiple clients or for a single client. Further, the root directory may for a single user, node, or client. For example, each user may have user-specific directory, each node may have node-specific directory, or users and nodes in the same client may share the directories of the client.

In one or more embodiments of the invention, within the root directory (200) is the input directory (130), jobs directory (132), active directory (136), and output directory (138).

An input directory (130) corresponds to a directory for jobs waiting to be executed in accordance with one or more embodiments of the invention. Further, in one or more embodiments of the invention, the jobs waiting to be executed correspond to job requests (202). Specifically, the input directory (130) includes functionality to receive job requests from a client (102).

A job request (202) corresponds to any type of mechanism for indicating that a job request to be executed. For example, a job request (202) may correspond to an entry in a database, a script, a file. In one or more embodiments of the invention, the job request (202) corresponds to a master script that specifies how to execute the job. Alternatively, the job request (202) may correspond to an executable program. Further, the job request (202) may also include parameters (not shown) for executing the job. In particular, the parameters specify how to execute the job. For example, the parameters may specify a particular execution environment (e.g., hardware, operating system, etc.), a scheduled time for execution, a priority level, duration for execution, input parameters into the executable, etc. Further, in a commerce environment, the parameters may also include cost parameters, such as a limit on the cost, etc.

Continuing with FIG. 2, a jobs directory (132) corresponds to a storage area for individual job data directories (204) in accordance with one or more embodiments of the invention. Specifically, each job data directory (204) may correspond to a separate directory for individual jobs. A job data directory (204) includes job data file (e.g., job data file 1 (206), job data file n (208)). A job data file (e.g., job data file 1 (206), job data file n (208)) may correspond to a program file (e.g., source code, executable, etc.), library, input files, configuration files, etc. Those skilled in the art will appreciate that each job data file (e.g., job data file 1 (206), job data file n (208)) may also correspond to specific directories. For example, a "bin" directory may be used to store program files, while a "data" directory may be used to store input data files.

Continuing with the sub-directories of the root directory (200), an active directory (136) includes functionality to maintain an executing job (210) in accordance with one or more embodiments of the invention. Specifically, in one or more embodiments of the invention, an executing job (210) corresponds to a job request (202) when the job request is being fulfilled. Thus, for example, an executing job (202) may correspond to entry in a database, a script that the user submits, a file, etc. Alternatively, the executing job (202) may correspond to intermediate output or statistics on the execution of the job.

Continuing with FIG. 2, another sub-directory of the root directory (200) is the output directory (138) in accordance with one or more embodiments of the invention. The output directory (138) corresponds to a structure for maintaining the results (212) for a particular job. Those skilled in the art will appreciate that rather than or in addition to maintaining results (212) in the output directory (212), the results may be directly sent to the client.

While FIG. 2 shows a hierarchical directory structure with the schema shown, those skilled in the art will appreciate that other directory structures are equally possible. For example, directories and files may be added or deleted from the shown structure. Alternatively, the file system may not be completely hierarchical.

Returning to FIG. 1 and the backend data center (106), the backend data center (106) also includes processors (e.g., processor 1 (140), processor x (144)) as used herein is consistent as understood and used in practice by one skilled in the art.

In addition to processors (e.g., processor 1 (140), processor x (144)), the backend data center (106) also includes storage (146) in accordance with one or more embodiments of the invention. Storage (146) corresponds to any type of mechanism known in the art for information storage. Moreover, in one or more embodiments of the invention, storage (146) corresponds to backup for the backend data center.

The processors (e.g., processor 1 (140), processor x (144)), storage (146), and remote files system for the client are connected to a job engine (148) in accordance with one or more embodiments of the invention. A job engine (148) corresponds to a logical component that includes functionality to orchestrate the jobs. Specifically, the job engine (148) includes functionality to identify the type of processor (e.g., processor 1 (140), processor x (144)) or computer system (not shown) with the associated hardware and software required to execute the job and schedule the job for execution. Scheduling the job for execution may also include initializing and/or performing the necessary transfer of files to the appropriate processor (e.g., processor 1 (140), processor x (144)). Moreover, the job engine (148) includes functionality to schedule the job according to parameters (102) specified by the client.

Figure 3:
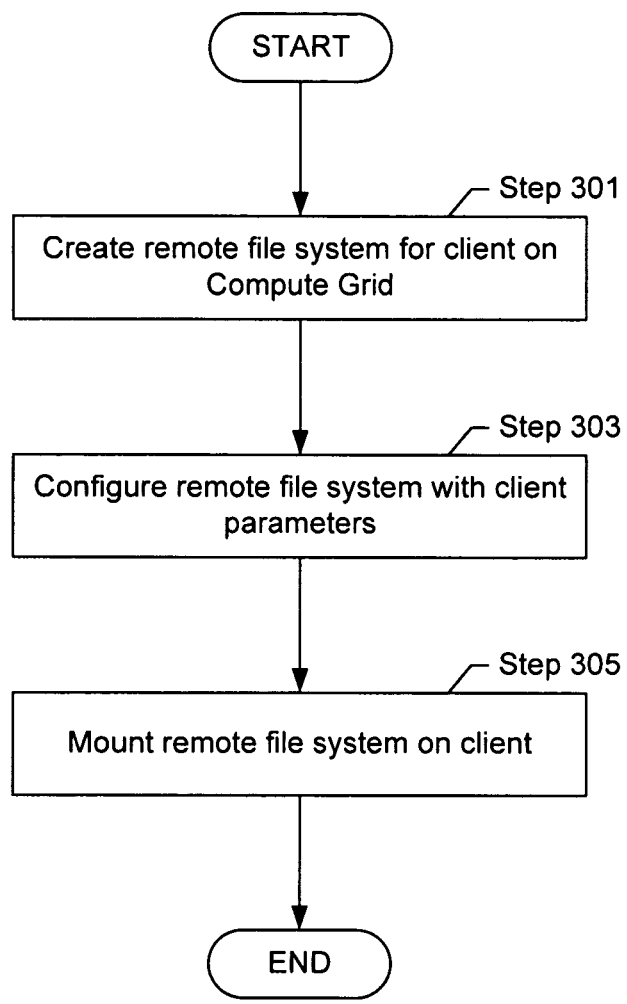
FIG. 3 shows a flowchart of a method for initializing a remote file system in accordance with one or more embodiment of the invention.

Typically, before the remote file system may be used to process jobs for the client, the system must be initialized. FIG. 3 shows a flowchart of a method for initializing a remote file system in accordance with one or more embodiment of the invention.

Initially, a remote file system for the client is created (Step 301). Creating the remote file system for the client may include creating the directory structure, reserving storage space, etc.

After creating the remote file system for the client, the remote file system is configured with the client parameters (Step 303). Specifically, at this stage, the client may specify parameters that are applicable for jobs scheduled by the client. For example, the client may specify that a limit for the amount that can be charged to the client or the client may specify specific hardware and software for executing the jobs, etc.

Next, the remote file system is mounted on the client (Step 305). Mounting the remote file system for the client may be performed in a central location of the client. Specifically, a user or administrator typically does not need to specify each node on which to mount the remote file system for the client. Once the remote file system for the client is mounted, then at startup, a file system manager is able to discover the remote file system for the client and add the remote file system interface to the file system. After adding the interface to the remote file system, the client is ready for storing requests for jobs to the backend data center.

Figure 4:
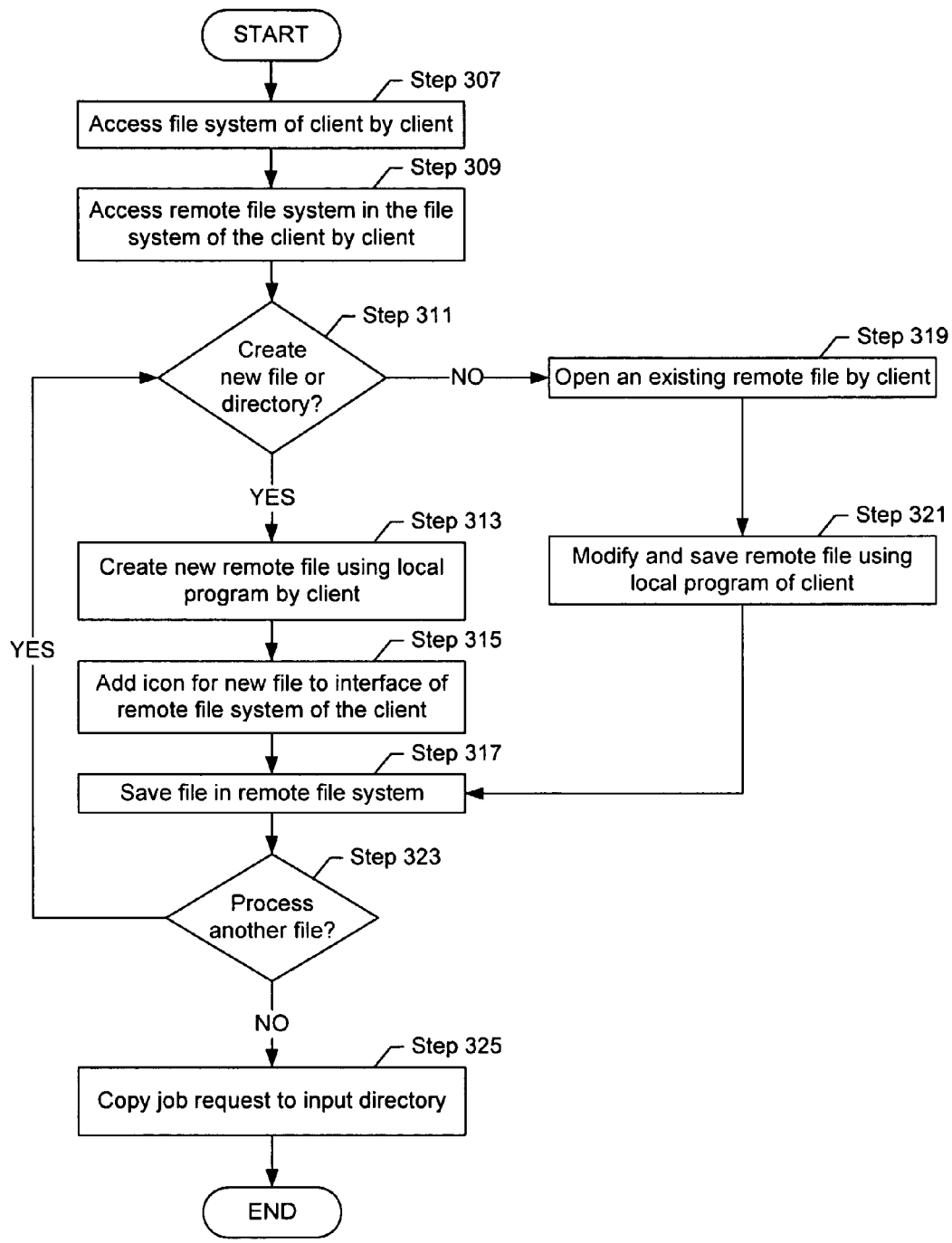
FIG. 4 shows a flowchart of a method for creating a job in accordance with one or more embodiments of the invention.

Accordingly, the system is ready for creating jobs from the client to the backend data center. FIG. 4 shows a flowchart of a method for creating a job in accordance with one or more embodiments of the invention.

Initially, the file system of the client is accessed by the client (Step 307). Specifically, the client may open a folder, or an application on the remote file system may send a request to the file system. The client may use virtually any interface known in the art, such as command line, graphical user interface, interfaces for applications, etc., for accessing a file system. Next, the remote file system is accessed from the file system of the client by the client (Step 309). Specifically, the client may use the remote file system interface in the file system of the client. Accessing the remote file system allows the client to send requests to the services by save new files or modify existing files.

Accordingly, after accessing the remote file system, a determination is made whether the client wants to create a new file or directory (Step 311). If the client wants to create a new file or directory, then the client creates a new file using a local program (Step 313). Specifically, at this stage, the client may create the file or directory using techniques known in the art for creating a file or directory locally. Thus, the interface to the remote file system is familiar to the client in accordance with one or more embodiments of the invention.

At this stage, the client may create source files, executables, data files, or any other type of file. In addition, the client may also create a file corresponding to the job request. For example, the client may create a master script. In one or more embodiments of the invention, the job request may be stored locally or in the job data directory for the job. Further, rather than creating a new file, the client may transfer the file from a local directory to the appropriate directory in the remote file system for the client.

When the client saves the file, or creates the directory and if the client is using a graphical user interface or other such interface, an icon for the new file is added to the interface of the remote file system of the client (Step 315). Once the new file is created, then the file is sent to the farm server (Step 317).

Alternatively, if the client does not want to create a new file or directory, then the client wants to modify an existing file. Accordingly, the client opens an existing remote file (Step 319). Opening the existing file may be performed in a manner similar to if the file were local. Specifically, the transference of information from the remote file system of the client to the local application for modification is seamless in accordance with one or more embodiments of the invention. The client may open the file using the local file system interface in accordance with one or more embodiments of the invention.

Next, the client may modify and save the existing remote file (Step 321). In accordance with one or more embodiments of the invention, modifying the existing file may be performed in a manner similar to modifying a file when the file is local. After or during the modifications, the modifications to the existing file are saved and the file is saved to the backend data center.

Regardless of whether the file is created or modified, sending the file to the farm server may include caching on a satellite server in the cache for the remote file system. When a file is cached on a satellite server, then the file may be transferred periodically (with other files) or immediately to the backend data center using virtually any synchronization protocol known in the art.

Continuing with FIG. 4, after modifying the file, a determination is made whether another file or directory is to be processed (Step 323). Specifically, the client may desire to make changes to another file or directory or create a new file or directory. If another file or directory is to be processed, then the method repeats determining whether to modify an existing file or directory (Step 311) in accordance with one or more embodiments of the invention.

Alternatively, if another file is not to be processed, and the client is to execute the job, then the job request is copied to the input directory in accordance with one or more embodiments of the invention (Step 325). By copying the job request to the input directory, the client shows that the job is ready for processing when the parameters specified in the job request are met.

Figure 5:
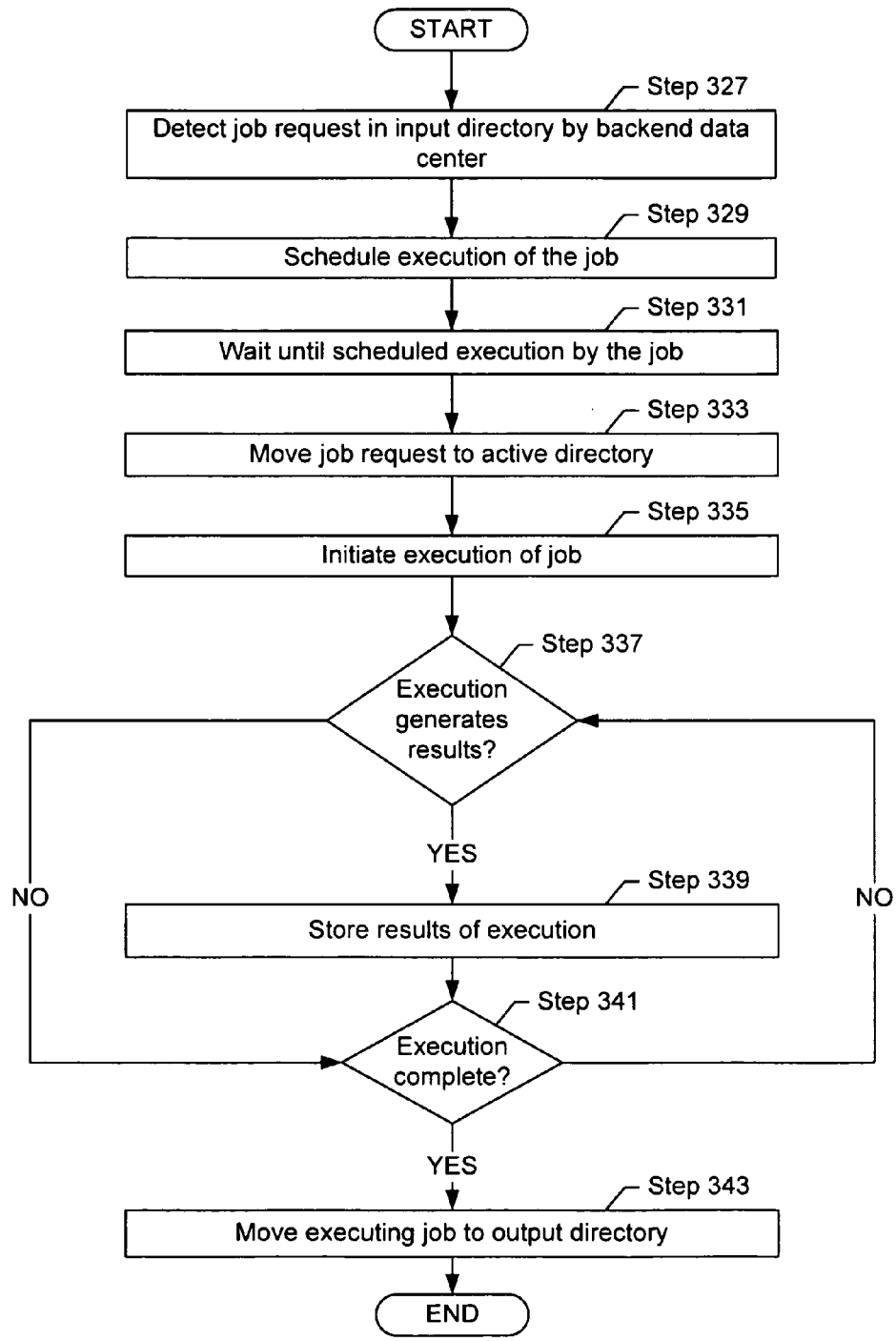
FIG. 5 shows a flowchart of a method for processing a job in accordance with one or more embodiments of the invention.

FIG. 5 shows a flowchart of a method for processing a job in accordance with one or more embodiments of the invention. Initially, the job request in the input directory is detected by the backend data center (Step 327). Detecting the job request may be performed by a listener associated with the input directory for the file system of the client. Specifically, a listener may detect when a change occurs in the input directory and notify the job engine. Those skilled in the art will appreciate that multiple techniques exist for detecting a job request. For example, the job request may alternatively be detected by periodically polling the input directory.

Regardless how the job request is detected, the execution of the job is scheduled (Step 329). When scheduling the execution of the job, parameters of the client and specified in the job request may be used. For example, if the job request specifies a particular operating system and applications, then the job may be scheduled according to the resources that have the particular operating system and application. As another example, if the job request specifies a time or priority level for executing the job, then job is scheduled accordingly.

Next, the job waits until the scheduled execution (Step 329). In one or more embodiments of the invention, while the job is waiting, the job request remains in the input directory. When the scheduled execution arrives, and the job can be processed, then the job request is moved to the active directory (Step 333) in accordance with one or more embodiments of the invention. Specifically, at this stage, the job request may be changed to an executing job in the active directory. Those skilled in the art will appreciate that if the job request corresponds to a master script, then the master script is moved to the active directory as the executing job. By moving the job request to the active directory, a user may view the directory to determine the status of the jobs. Specifically, because only jobs that are being executed are in the master directory, the user can view the master directory and determine which jobs are being executed. Thus, the user is able to have an easy interface for viewing the status of different jobs the user may have scheduled.

Accordingly, the execution of the job is initiated (Step 335). Initiating execution of the job may involve performing any steps known in the art. For example, files may be copied into positions that are accessible by the processor, etc. In one or more embodiments of the invention, while the job is executing, a determination is made whether the execution of the job generates results (Step 337). If the execution generates results, then the results are stored (Step 339). The results may be intermediate results or final results. Further, the results may be stored directly into the output directory or in the active directory while the job is executing. In one or more embodiments of the invention, the results are viewable by the client during execution.

Once the results are stored, or if the execution does not generate results, then a determination is made whether the execution is complete (Step 341). If the execution of the job is not complete, then the method continues with determining whether the execution generates results (Step 337).

When the execution completes, then the executing job is moved to the output directory (Step 339). At this stage, if the job request corresponds to a master script, then the master script is moved to the output directory. Also, any results that are generated may be moved to the output directory. Thus, by viewing the remote file system as if the remote file system were local, the user is able to determine when a job completes execution in accordance with one or more embodiments of the invention.

Figure 6:
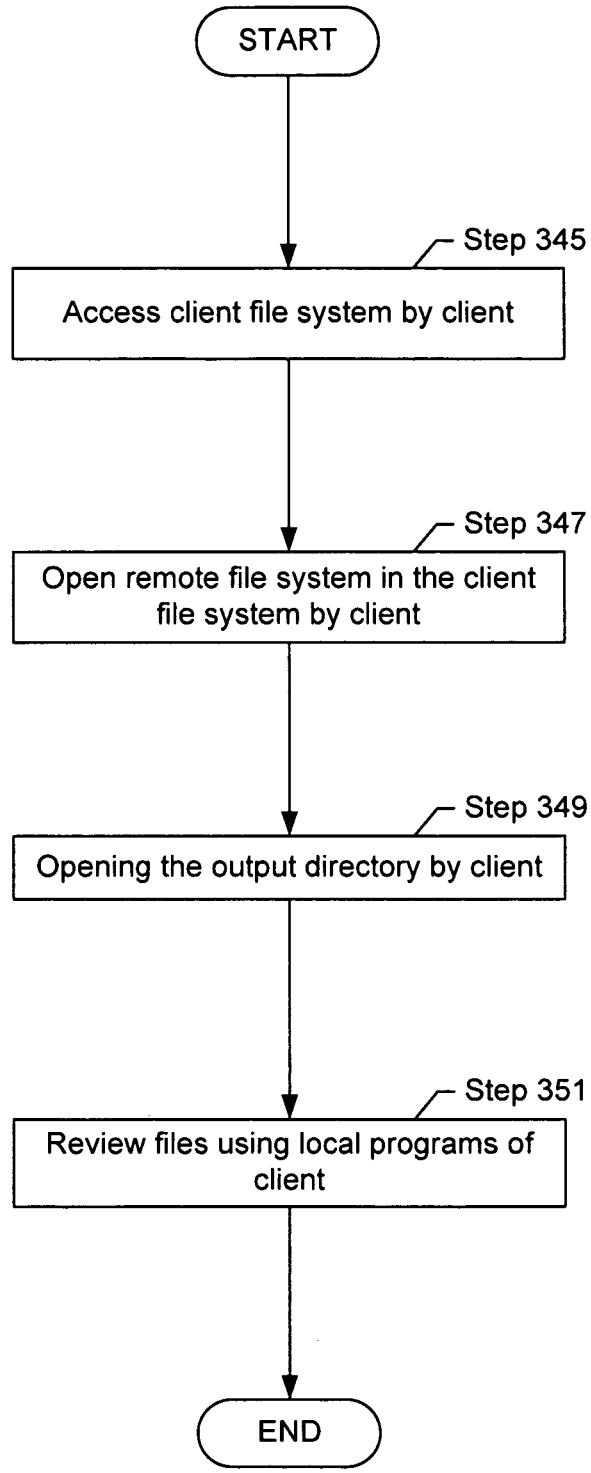
FIG. 6 shows a flowchart of a method for reviewing results of a job in accordance with one or more embodiments of the invention.

During or after execution of the job, the user may review the results of the job. FIG. 6 shows a flowchart of a method for reviewing results of a job in accordance with one or more embodiments of the invention. Initially, the file system of the client is accessed by the client (Step 345). Specifically, the client may open a folder, or an application on the remote file system may send a request to the file system. The client may use virtually any interface known in the art, such as command line, graphical user interface, interfaces for applications, etc., for accessing a file system. Next, the remote file system is accessed from the file system of the client by the client (Step 347). Specifically, the client may use the remote file system interface in the file system of the client. Accessing the remote file system allows the client to send requests to the services by save new files or modify existing files.

In one or more embodiments of the invention, once the remote file system is accessed, the client may open the active directory if the job is still in execution or the output directory (Step 349). Next, the client may review the files in the directory using the local programs of the client (Step 351). Specifically, at this stage, the client may review the contents of the results as if the results were stored locally. Further, in one or more embodiments of the invention, if the client is viewing a job that is still executing, the client may open a copy of the results or may open the results in a read-only mode. Further, the results may be periodically updated while the client is viewing the files based on newly generated results.

In the following example, consider the scenario in which a researcher wants to forecast weather patterns in a particular region of interest. In the example, the researcher may have set multiple sampling stations across the particular region of interest.

A local data collection program on the researcher's computer periodically submits a request to the sampling stations to return data to the local data collection program. Because the interface to the remote file system makes the remote file system appear as if stored locally, the local data collection program automatically saves the data to the appropriate job data directory when the data is returned from the sampling stations.

In order to forecast the weather patterns, the researcher may create a program for forecasting the weather patterns. Specifically, the researcher may develop the program using a local software developer tool. As the researcher is creating the file(s) for the program, the researcher saves the program to the remote file system for the researcher as if the remote file system is local. Specifically, the researcher may access the local file system in order to access the remote file system.

When the researcher has completed developing the program, the researcher may create a job request corresponding to a master script. The job request may specify that the job is only to execute at night using certain data files with the data received from specific sampling stations as input parameters. The researcher than saves the job request to the input directory by moving or copying the job request.

In one or more embodiments of the invention, a listener in the input directory detects the new job request and reviews the parameters for executing the job. Accordingly, the listener schedules the job to execute at night.

When night falls, the job is executed. As the job is executing, the results are stored to the output directory in accordance with one or more embodiments of the invention. The concerned researcher awakens at one in the morning to determine whether errors exist in the program and if the program is executing correctly. Accordingly, without halting execution of the job, the researcher uses a home computer that has the remote file system mounted on it to view the results.

At this stage, if the researcher detects an error in the program or job, then the researcher may stop the execution and submit a new job by making changes to the job request and storing the job request in the input directory. Alternatively, if the researcher discovers that everything is functioning correctly, then without loosing any execution time, the researcher is able to gain a piece of mind and sleep well.

As shown in the example, creating and submitting jobs to the backend may be performed as easily and efficiently as if the job were performed locally. Furthermore, the researcher can review the results without adjusting the completion time for the job.

Figure 7:
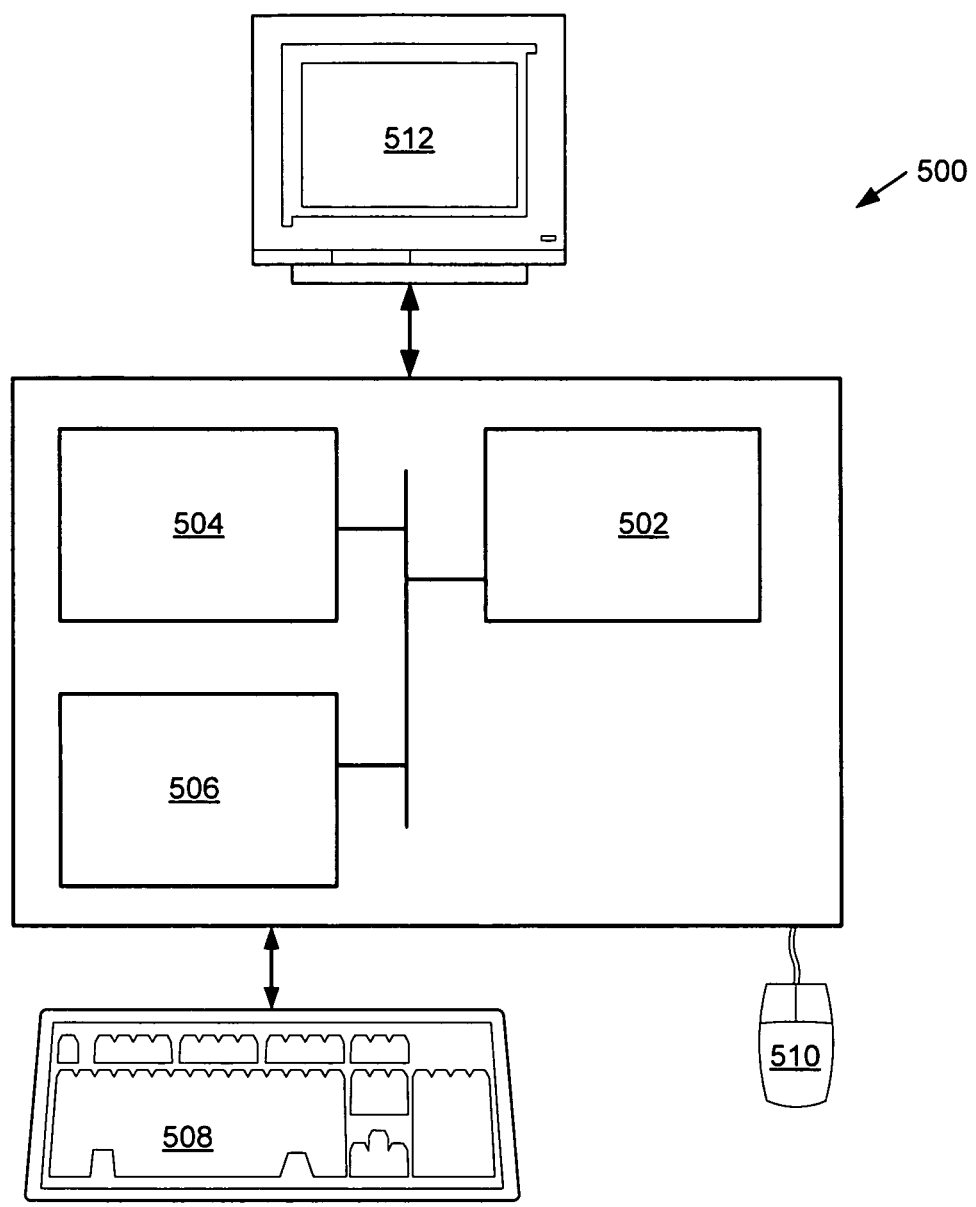
FIG. 7 shows a computer system in accordance with one or more embodiments of the invention.

The invention may be implemented on virtually any type of computer regardless of the platform being used. For example, as shown in FIG. 7, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., input directory, output directory, processors, storage, job engine, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention may include one or more of the following advantages. First by storing files to a remote file system, the complex set of user interfaces, protocols and system management tools that a managed service provider previously must use is hidden and in some cases eliminated. Specifically, because both the backend and the user may access the same set of files and the actual transfer of the data in the files are hidden.

Further, embodiments of the invention provide a mechanism whereby jobs can be developed, debugged, and submitted using a user's familiar local interface. Further, the compilation, optimization and configuration of property files, input data files, shared libraries, etc. may be performed using local programs.

In addition, embodiments of the invention provide a mechanism for using a variety of resources when executing the job. For example, the job is not necessarily limited to a particular instruction set architecture (ISA), operating system, etc. Rather, any executable file, such as shell scripts, etc. can be scheduled to execute. Moreover, a job that is submitted may include multiple executables and files, such as input and output data files, libraries, scripts, configuration/property files, and runtime variables.

Also, embodiments of the invention provide a mechanism whereby a user, can control and view the order and parameters for executing the files. Thus, in one or more embodiments of the invention, the user may have complete control and view of the user's active jobs, including the results of the job.

Furthermore, embodiments of the invention provide a method for maintaining the backend data center as a commercial endeavor. Specifically, job accounting for such resources as run time, file system disk usage for job data, and result data etc may be automatically instrumented. Automatically instrumenting the accounting may be performed by using accounting information that is supplied by the file system, file modification times, size and ownership and that are implicit in most existing file systems. Thus, the accounting for a commercial endeavor is simplified.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a job using a remote file system comprising:
   obtaining, by the remote file system located on a first node, a plurality of job data files and a job request comprising a program from a second node, the second node comprising:
      a file system comprising a directory structure that includes an interface to local storage on the second node and an interface to the remote file system, and
         wherein the second node is configured to transfer the job request and the plurality of job data files to the remote file system using the interface to the remote file system, and
         wherein transferring the job request comprises storing the job request as a file in an input directory in the remote file system;
   detecting, by the first node, that the job request for the job is stored in the input directory of the remote file system;
   receiving at least one parameter to execute the program, wherein the at least one parameter specifies at least one from a group consisting of a time to execute the program, an operating system, a cost, and a priority; and
   executing, by the first node, using the plurality of job data files, the program based on detecting that the job request is stored in the input directory, wherein executing the program generates an output file and wherein executing the program is performed according to the parameter, wherein the first node and the second node are different computer systems.

2. The method of claim 1, wherein the plurality of job data files are stored in a jobs directory on the remote file system.

3. The method of claim 1, further comprising:
   outputting the output file to an output directory of the remote file system.

4. The method of claim 1, wherein the output file is viewable via the interface to the remote file system during execution of the program.

5. The method of claim 1, wherein a listener associated with the input directory detects a change of the job request in the input directory, wherein, in response to detecting the change, the listener sends a notification of the change to a jobs engine, and wherein the job engine schedules execution of the program in response to the notification.

6. A distributed computer system having a plurality of nodes for performing a method comprising:
   obtaining, by a remote file system located on a first node, a plurality of job data files and a job request comprising a program from a second node, the second node comprising:
      a file system comprising a directory structure that includes an interface to local storage on the second node and an interface to the remote file system, and
         wherein the second node is configured to transfer the job request and the plurality job data files to the remote file system using the interface to the remote file system, and
         wherein transferring the job request comprises storing the job request as a file in an input directory in the remote file system;
   detecting, by the first node, that the job request for a job is stored in the input directory of the remote file system;
   receiving, by the first node, at least one parameter to execute the program, wherein the at least one parameter specifies at least one from a group consisting of a time to execute the program, an operating system, a cost, and a priority; and
   executing, by the first node, using the plurality of job data files, the program based on detecting that the job request is stored in the input directory, wherein executing the program generates an output file and wherein executing the program is performed according to the parameter, wherein the first node and the second node are different computer systems.

7. The distributed computer system of claim 6, wherein the output file is viewable via the interface to the remote file system during execution of the program.

8. The distributed computer system of claim 6, wherein a listener associated with the input directory detects a change of the job request in the input directory, wherein, in response to detecting the change, the listener sends a notification of the change to a jobs engine, and wherein the job engine schedules execution of the program in response to the notification.

* * * * *